United States Patent [19]
Reuter et al.

[11] Patent Number: 5,199,325
[45] Date of Patent: Apr. 6, 1993

[54] ELECTRONIC SHIFT OR CLUTCH ACTUATOR FOR A VEHICLE TRANSMISSION

[75] Inventors: David C. Reuter, Fort Wayne; John S. Sewell, Columbia; Robert Leeper, Ft. Wayne, all of Ind.

[73] Assignee: Dana Corporation, Toledo, Ohio

[21] Appl. No.: 760,528

[22] Filed: Sep. 12, 1991

[51] Int. Cl.$^5$ ............................................. F16D 13/52
[52] U.S. Cl. ..................................... 74/861; 192/48.5; 192/94; 192/106.1; 192/109 R; 180/233; 180/248; 464/57; 464/169
[58] Field of Search ...................... 192/48.5, 48.91, 94, 192/106.1, 106.2, 109 R; 180/233, 248; 464/57, 169; 74/861

[56] References Cited

U.S. PATENT DOCUMENTS

| | | | |
|---|---|---|---|
| 741,895 | 10/1903 | Earll | 192/40 |
| 2,091,268 | 8/1937 | Colman | 192/40 |
| 2,185,537 | 1/1940 | Brownlee | 74/376 |
| 2,210,239 | 8/1940 | Hale | 74/864 |
| 2,465,054 | 3/1949 | Berg | 192/94 |
| 3,235,045 | 2/1966 | Pop | 192/18 B |
| 3,419,118 | 12/1968 | Allaben | 192/35 |
| 3,507,374 | 4/1970 | Allaben | 192/84 R |
| 4,344,305 | 8/1982 | Holmes | 464/169 |
| 4,373,604 | 2/1983 | Lunn et al. | 192/48.5 X |
| 4,381,049 | 4/1983 | Crossman | 188/72.7 |
| 4,561,520 | 12/1985 | Fogelberg | 180/247 |
| 4,648,492 | 3/1987 | Moore | 192/3.21 |
| 4,723,622 | 2/1988 | Toshikuni et al. | 192/48.5 X |
| 4,775,040 | 10/1988 | Telford | 192/94 X |
| 4,865,173 | 9/1989 | Leigh-Monstevens et al. | 192/0.02 R |
| 4,883,138 | 11/1989 | Kameda et al. | 180/248 X |
| 4,895,236 | 1/1990 | Sakakibara et al. | 192/84 R |
| 4,949,594 | 8/1990 | Galhotra | 180/233 X |
| 5,024,638 | 6/1991 | Sakakibara et al. | 192/94 X |

FOREIGN PATENT DOCUMENTS

| | | | |
|---|---|---|---|
| 513823 | 12/1930 | Fed. Rep. of Germany | 192/94 |
| 3908478 | 10/1989 | Fed. Rep. of Germany | 192/94 |
| 57-103934 | 6/1982 | Japan | 192/48.91 |

Primary Examiner—Allan D. Herrmann
Assistant Examiner—William O. Trousdell
Attorney, Agent, or Firm—MacMillan, Sobanski & Todd

[57] ABSTRACT

The present invention is directed to an electronic actuator for use in a vehicle transmission such as a four wheel drive transfer case. In one preferred embodiment, the transfer case includes two separate electronic actuators, a range shift actuator which is utilized to effect shifting of the transfer case between high range, neutral, and low range drive positions, and a clutch actuator which is utilized to control engagement of a clutch between two wheel drive, automatic ("on demand" four wheel drive), and "part time" four wheel drive operating modes. The range shift actuator includes a rotary electric motor coaxially mounted relative to a rear output shaft of the transfer case, and a linear screw for translating the rotational movement of the motor shaft to selective axial movement of a range shift sleeve. The clutch actuator is similar to the range shift actuator except that, since the torque requirements necessary to bias the clutch are substantially greater than that necessary to effect the range shift, the clutch actuator includes additional gear reduction to enable the actuator to generate a sufficient axial force to fully engage the clutch. The actuators do not draw any current load after they have moved to their controlled positions and, because the linear screws can not be back driven, their previously set positions are maintained in the event of motor failure or power loss.

20 Claims, 6 Drawing Sheets

ELECTRONIC SHIFT OR CLUTCH ACTUATOR FOR A VEHICLE TRANSMISSION

BACKGROUND OF THE INVENTION

The present invention relates generally to vehicle transmissions and, in particular, to a vehicle transmission such as a four wheel drive transfer case which includes an electronic actuator for effecting shifting or clutch engagement.

Four wheel drive (4WD) systems for vehicles are becoming increasingly popular, due to the enhanced traction capabilities that such systems can provide in inclement weather or off highway conditions over conventional 2WD systems. Such 4WD systems generally include a torque transfer case which can either be integral with or separate from the main transmission. The torque transfer case can include an input shaft connected to the output of the main transmission, a rear output shaft connected to drive the vehicle rear wheels, a front output shaft connected to drive the vehicle front wheels, and means for drivingly connecting the input shaft to the front and rear output shafts.

In one type of 4WD system known as a "part time" system, when in a 4WD mode, there is a direct drive connection between the front and rear output shafts of the transfer case. This direct drive connection does not permit the transfer case to accommodate different front and rear wheel speeds which can occur when turning the vehicle. Accordingly, the 4WD mode is generally used only on a "part time" basis, such as when lower friction road surface conditions, e.g., wet or snow covered pavement, may require increased traction capabilities. When turning the vehicle under these conditions, the lower friction road surface allows a limited amount of slip between the slightly faster spinning front wheels and the road surface. Otherwise, turning such a vehicle on a higher friction surface, such as dry pavement, results in what is known as "front wheel hop".

The transfer case also generally includes a shifting means operable by the vehicle driver for selecting whether the vehicle is to be operated in either a 2WD or "part time" 4WD mode. Also, such shifting means often enables the driver to select between a "high range" 4WD mode and a "low range" 4WD mode. In the past, such shifting means typically included an all-mechanical arrangement wherein a driver operated shift lever was coupled to axially shift (via a shift fork) an internal shift sleeve in transfer case between the various operating modes. More recently, "part time" 4WD transfer cases have been provided with electronic actuators for effecting the above shifting operations.

Some vehicles are provided with a "full time" 4WD system which is permanently engaged in all driving conditions. In this type of system, which has become known as an "all wheel drive" (AWD) system, the transfer case is generally provided with an interaxle differential for dividing torque between the vehicle front and rear differentials. The interaxle differential accommodates different front and rear wheel speeds when turning the vehicle, and thus enables the system to remain permanently engaged in all operating conditions. Also, in order to prevent excessive slipping between the front and rear wheels, and transfer cases typically include a selectively engageable clutch means which is operative to lock the interaxle differential upon sensing a predetermined slippage between the front and rear output shafts of the transfer case.

SUMMARY OF THE INVENTION

The present invention is directed to an electronic actuator for use in a vehicle transmission such as a 4WD transfer case. In one preferred embodiment, the transfer case includes two separate electronic actuators, a range shift actuator which is utilized to effect shifting of the transfer case between high range, neutral, and low range drive positions, and a clutch actuator which is utilized to control engagement of a clutch between 2WD, automatic (i.e., "on demand" 4WD), and "part time" 4WD operating modes.

The range shift actuator includes a rotary electric motor coaxially mounted relative to a rear output shaft of the transfer case. The motor includes a hollow motor shaft surrounding the output shaft. Further, an axially shiftable and non-rotatable hollow shift sleeve surrounds the output shaft and is movable between a first axial position wherein the transfer case operates in the high range mode, through a neutral position, and into a second axial position wherein the transfer case operates in the low range mode. In order to effect axial shifting of the shift sleeve, means (such as a linear screw) are provided for translating the rotational movement of the motor shaft to selective axial movement of the shift sleeve. More specifically, in the preferred embodiment, the motor shaft is provided with an axially extending first threaded portion adapted to engage a second axially extending threaded portion provided on the shift sleeve. Thus, rotary motion of the motor shaft is translated into axial movement of the shift sleeve.

In the preferred embodiment of the invention, a rotation stop is incorporated into the motor and defines the low range shift position when the motor is rotated fully in one direction to engage the stop, and defines a high range shift position when the motor is rotated fully in an opposite direction to engage the stop. Also, in the shift sleeve encounters some temporary resistance when attempting to effect a shift, the shift sleeve incorporates a dual sleeve arrangement, which includes a spring biased lost motion connection.

The clutch actuator is similar in operating principals to the range shift actuator except that, since the torque requirements necessary to bias the clutch are substantially greater than that necessary to effect the range shift, the clutch actuator includes additional gear reduction to enable the actuator to generate a sufficient axial force to fully engage the clutch.

One particular advantage of the above described actuators is that, once the desired shift is made (via the range shift actuator) or the desired amount of clutch engagement is set (via the clutch actuator), no further electric current needs to be supplied to the actuators to maintain their set positions, since the inherent frictional characteristics of the linear screw structure prevent the actuators from being back driven. Thus, in the event of a motor failure or loss of electrical power, the previously set actuator positions will be maintained.

Another advantage of the present clutch actuator relates to the precise control which can be achieved when the system is operated in the "on demand" 4WD mode.

The above, as well as other advantages of the present invention, will become readily apparent to one skilled in the art from reading the following detailed description in conjunction with the attached drawings.

DESCRIPTION OF THE PREFERRED EMBODIMENT

Figure 1:
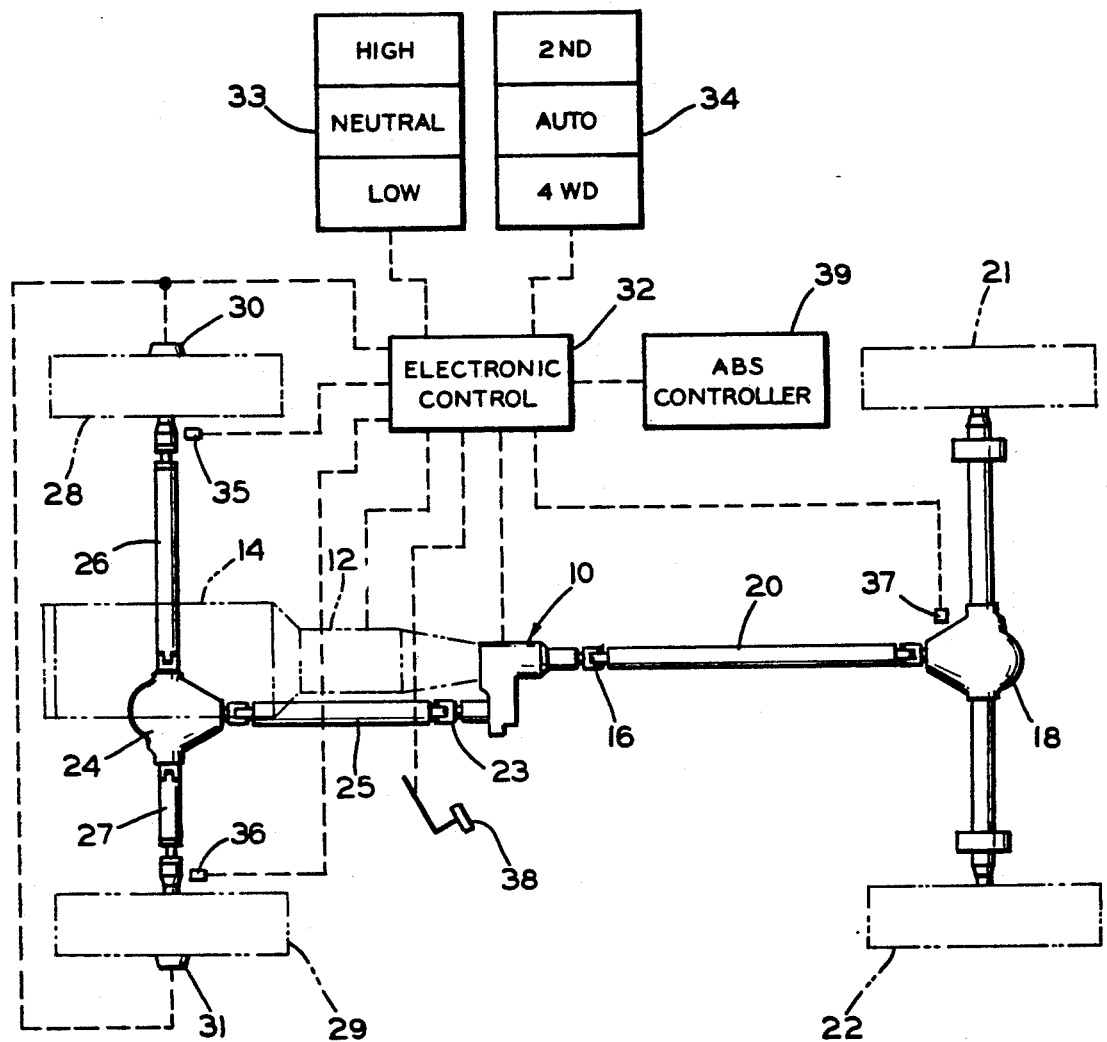
FIG. 1 is a top plan view of a four wheel drive system including a electronically controlled transfer case having the features of the present invention.

Referring first to FIG. 1, there is shown a vehicle four wheel drive system which utilizes a transfer case incorporating the electronic actuators of the present invention. As shown in FIG. 1, a transfer case 10 is secured to the rear of a main transmission 12 (shown in phantom) which in turn is coupled to a drive engine 14 (also shown in phantom). As will be discussed, the transmission 12 is provided with an output shaft which is coupled to an input shaft of the transfer case 10. The transfer case 10 includes a rear output shaft which is connected at 16 to a rear drive shaft 20 which in turn is connected to a rear differential. The rear differential 18, which can be a limited slip type, divides torque from the drive shaft 20 between the rear wheels 21 and 22.

The transfer case 10 is provided with a front output shaft which is connected at 23 to a front drive shaft 25 which in turn is connected to a front differential 24. The front differential 25, which can also be a limited slip type, divides torque received from the front drive shaft 25 between front axles 26 and 27 which are connected to vehicle front wheels 28 and 29 by automatic hub locks 30 and 31, respectively. The hub locks can be vacuum actuated.

Also shown in FIG. 1 are certain electrical connections (shown as dashed lines) to a microprocessor-based electronic control which is represented by a block 32. The transfer case can be operated in various operating modes as selected by the vehicle driver via control switches 33 and 34, which are typically located in the vehicle interior within convenient reach of the driver. The one switch 33 is used to shift the transfer case between high range, neutral, and low range, while the second switch 34 allows the driver to select between three different operating modes: two wheel drive (2WD), "on demand" four wheel drive (AUTO), and "part time" four wheel drive (4WD). Each switch can include three separate status lights to provide a visual indication to the driver of the present operating mode. Also, when effecting a mode change such as a range shift, the respective light can be flashed until the shift is complete. In addition to being connected to control the transfer case in a manner as will be discussed, the control is also connected to generated activation signals to the hub locks 30 and 31 when the "on demand" or "part time" operating modes are selected.

To effect the desired control of the transfer case and the hub locks 30 and 31, the control 32 is connected to receive a plurality of input signals. The control 32 receives signals representing the individual front wheel speeds from separate speed sensors 35 and 36, and a signal representing an average rear wheel speed (vehicle road speed) from a single rear speed sensor 37 located at the rear differential 18 or, alternatively, in the transfer case 10. The speed sensors 35, 36 and 37 can be part of an ABS (anti-brake system) control, or they can be provided solely for use in controlling the transfer case. As will be discussed, the two front sensors are advantageously used in the "AUTO" mode to determine front steering angle which, in conjunction with the vehicle road speed, functions to determine the acceptable slip threshold of the rear wheels. In some situations, the two front sensors 35 and 36 may be replaced with a single front speed sensor located in the transfer case and then, if desired, obtain the steering angle information from another source (such as the steering gear).

The control 32 also receives a status signal from the transmission 12 which informs the control when the main transmission is in a "neutral" mode. As will be discussed the system only allows a shift between high and low range 4WD and neutral when the transmission 12 is in neutral. The control further receives a brake status signal from the vehicle brake system indicating when a brake pedal 38 has been actuated. The control 32 can also be configured to supply a status signal to an ABS controller 39 to indicate when the system is operating in either the high or low 4WD modes.

Figure 2:
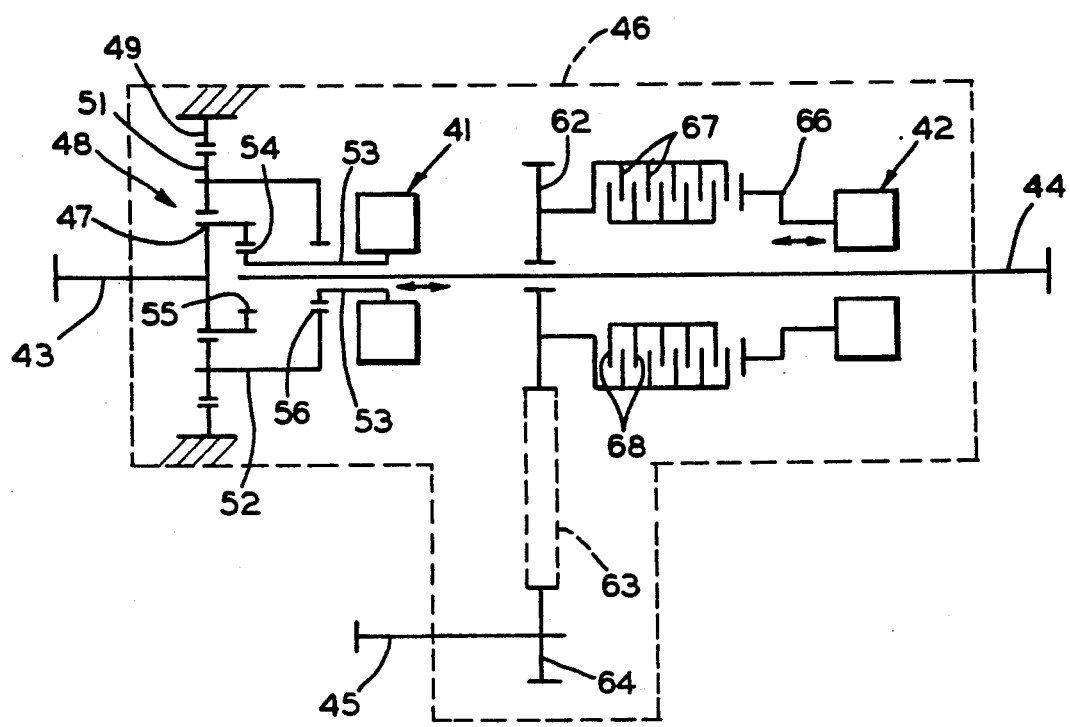
FIG. 2 is a schematic diagram of the internal components of the transfer case of FIG. 1.

Referring now to FIG. 2, there is shown a schematic diagram of the internal components of the transfer case 10 of FIG. 1, and which incorporates an electric range shift actuator, generally indicated at 41, and an electric clutch actuator, generally indicated at 42, constructed in accordance with the present invention. As shown in FIG. 2, the transfer case 10 includes an input shaft 43 coupled to the output shaft of the vehicle transmission 12 (shown in FIG. 1), a rear output shaft 44 for connection to the rear drive shaft 20, and a front output shaft 45 for connection to the front drive shaft 25.

The input shaft 43 is rotatably supported at the forward end of a transfer case housing 46 and incorporates a sun gear 47 which forms part of a planetary gear reduction assembly, generally indicated at 48, used to achieve the low gear operating range. The planetary assembly 48 includes a ring gear 49 fixed relative to the housing 46, and a plurality of planet gears 51 circumferentially spaced and individually rotatably supported by a planet carrier 52. The rear output shaft 44 extends forwardly into the housing 46 and carries at its forward end an axially moveable range shift sleeve 53 having external splines 54 for engagement with either internal splines 55 connected to the input shaft 43, or internal splines 56 connected to the planet carrier 52. When connected to the input shaft 43, as shown above the axis A—A in FIG. 3, there is a direct drive connection between the input shaft 43 and the rear output shaft 44 to define the high speed range. When connected to the planet carrier 52, as shown below the axis A—A, the planetary gear assembly 48 introduces a predetermined gear reduction to define the low speed range. When located at an intermediate position (not shown) between the input shaft splines 55 and the carrier splines 56, the transfer case is in neutral.

The present invention concerns the use of a specially designed electric range shift actuator, generally indicated at 41, and which is utilized to effect the axial movement of the shift sleeve 53 between low range, neutral, and high range positions. In FIG. 2, the actuator 41 is represented by a block which coaxially surrounds the rear output shaft 44. As will be discussed in more detail hereinafter with regard to FIGS. 3-5, the actuator 41 utilizes an electric rotary motor coaxially mounted around the shaft 44, and means, such as a linear screw, for translating the rotational movement of the hollow motor shaft to selective axial movement of the range shift sleeve 53. The actuator 41 is coupled to receive control signal from the control 32 and, in some cases, to provide feedback information to the control.

A first drive sprocket 62 is rotatably supported on a central portion of the rear output shaft 44 and is connected by a drive chain 63 to drive a second drive sprocket 64 rotatably supported within the transfer case housing 46 and connected to drive the front output shaft 45. A multi-disc 4WD clutch 65 is provided to control torque input to the front output shaft, and includes a first group of clutch plates 67 which, while axially moveable, are secured for rotation with the first drive sprocket 62. A second group of clutch plates 68 are secured for rotation with the rear output shaft, but are also axially moveable. The bias of the clutch is applied by a clutch actuating sleeve 66 which is controlled by the electric clutch actuator 42. The actuator 42 is connected to receive operating signals from the control 32.

The electric clutch actuator 42 is similar in operating principle to the range shift actuator 41 and includes a rotary electric motor and uses means such as a linear screw for translating rotary movement to axial movement; however, as will be discussed, since the torque requirements necessary to bias the 4WD clutch 65 is substantially greater that that necessary to move the range shift sleeve 53, additional gear reduction is provided.

In operation, shifts are allowed directly between all operating modes, except into 4WD low range mode. This range can only be accessed from the 4WD high range mode when the vehicle is stopped. Since the electronic and mechanical hardware allows a direct shift between any and all modes, changes which are required to limit the availability of mode changes can be accomplished by software changes. The following paragraphs will summarized the operation of the drive system in its various operating modes.

2WD—In this mode, the front hub locks 30 and 31 are disengaged and the 4WD clutch 65 is fully disengaged. All of the driving torque is directed to the rear wheels. When a driver at any vehicle speed has selected 2WD via the switch 34 shown in FIG. 1, the control 32 generates a disengage signal to the 4WD clutch, which causes the clutch actuator 42 to fully retract the actuator sleeve 66 and disengage the clutch 65. Immediately following, the control 32 sends a disengage signal to the front hub locks 30 and 31. The system will remain in this state until a different operating mode is selected by the driver. Typically, the control only allows 2WD in the high range, due to limitations of rear axle stress levels; however, if rear axle stress levels are sufficient, low range 2WD may be provided.

High Range 4WD—In this mode, the range switch 33 is in the High position, the hub locks 30 and 31 are engaged, and the 4WD clutch is fully engaged. The front and rear drive shafts are rigidly connected (i.e., no interaxle differential), so that torque is distributed to to the front and rear wheels based upon the traction available at each wheel. When high range 4WD mode is selected at any vehicle speed by the driver from the 2WD mode, the control 32 generates an engage signal to the actuator 42 to fully advance the actuator sleeve 66 and engage the clutch 65. After full engagement of the clutch, and synchronization of the front axles and wheels, the control sends an engage signal to the front hub locks 30 and 31. The system then remains in this state until a different operating mode is selected by the driver.

Low Range 4WD—This mode is similar to the High range 4WD mode, except that the range switch 33 is in the Low position; however, the sequence for entering this mode is different. This mode is only selectable when the system is in the high range 4WD mode. When low range 4WD is selected, the control 32 checks to see if the vehicle is stopped and the transmission 12 is in neutral. If both of these conditions are met, the control generates a shift signal to the actuator 41 to shift the range shift sleeve 53.

Neutral—In this mode, the range switch 33 (and thus the range shift sleeve 53) is in neutral, the front hub locks 30 and 31 are disengaged, and the 4WD clutch is fully disengaged. Since no torque is directed to either the front or rear drive shafts, the main transmission 12 can not be back driven. When the range shift switch 33 is initially set to neutral from the 2WD mode, the control 32 checks to see if the vehicle is moving at less than a predetermined speed, such as 6 miles per hour, and if the transmission 12 is in neutral, and if the brakes are engaged. If all these conditions are met, the control generates a shift signal to move the range shift sleeve 53 to its neutral position.

AUTO ("on-demand" 4WD)—As is the case with 2WD, this mode is typically only available in high range; however, if rear axle stress limits are sufficient, low range may be used. In the AUTO mode, the hub locks 30 and 31 are engaged, and the 4WD clutch 65 is, as will be discussed, in a "ready" position. If the vehicle is in 2WD mode and the AUTO mode is selected at any vehicle speed, the controller generates an engage signal for the 4WD clutch 65. The clutch is then engaged sufficiently to synchronize the front output of the transfer case with the front wheels, after which the controller sends an engage signal to actuate the front hub locks. Once the hub locks have engaged, the control disengages the four wheel drive clutch. Thereafter, the control will continuously monitor rear wheel slip. When the control senses excessive rear wheel slip, the 4WD clutch automatically engages to transmit the required level of torque to the front axle for as long as is needed. When rear wheel slip is no longer present, the clutch disengages, and remains disengaged until rear wheel slip is detected. To provide for full ABS compatibility, in the event the brakes are engaged while in the AUTO mode and the vehicle speed is above a predetermined amount (e.g., six miles per hour), the 4WD clutch 65 is immediately disengaged.

Normally, in the AUTO mode, the electronic control will permit a predetermined slippage between the front and rear output shafts to accommodate slightly different front and rear wheel speeds which occur during normal traction condition such as when turning the vehicle. This predetermined slippage can be a function of vehicle road speed and the steering angle. However, when slippage between the front and rear wheels exceeds a predetermined amount, the electronic control 32 will generate a signal to the clutch actuator 42 which selectively advances the actuator sleeve 66 to create sufficient bias in the clutch to provide a drive connection between the input shaft 43 and the front output shaft 45 and eliminate the excessive slippage condition. The control will then selectively back off the actuator while simultaneously monitoring slip. Should slippage again occur the control will readvance the actuator sleeve 66. As long as the switch 34 remains in the AUTO mode, the control 32 will continue to monitor rear wheel slip and, as required, transfer torque to the front wheels through the 4WD clutch 65 to eliminate the slip.

Figure 3:
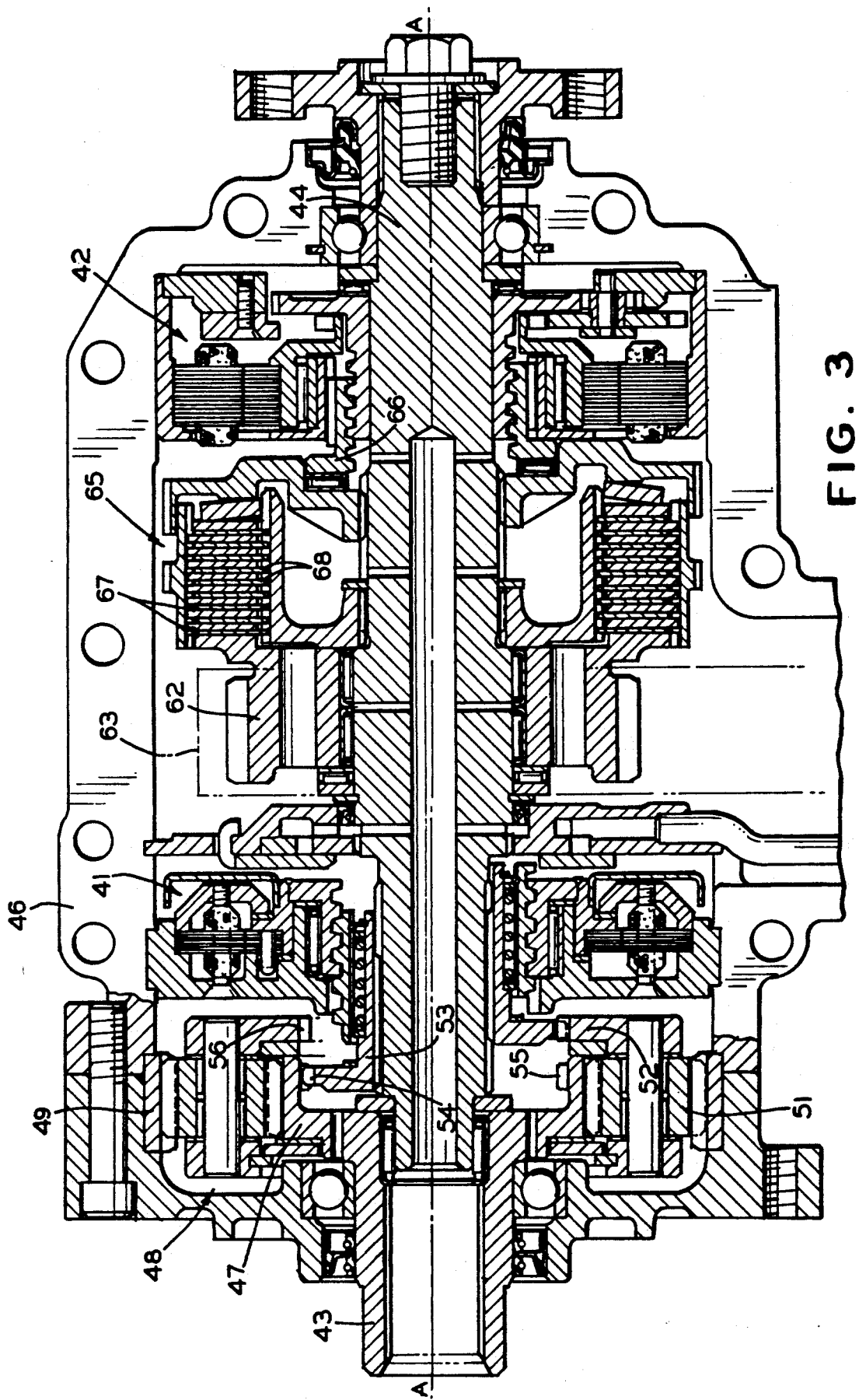
FIG. 3 is a sectional view through the transfer case of FIG. 1.
Figure 4:
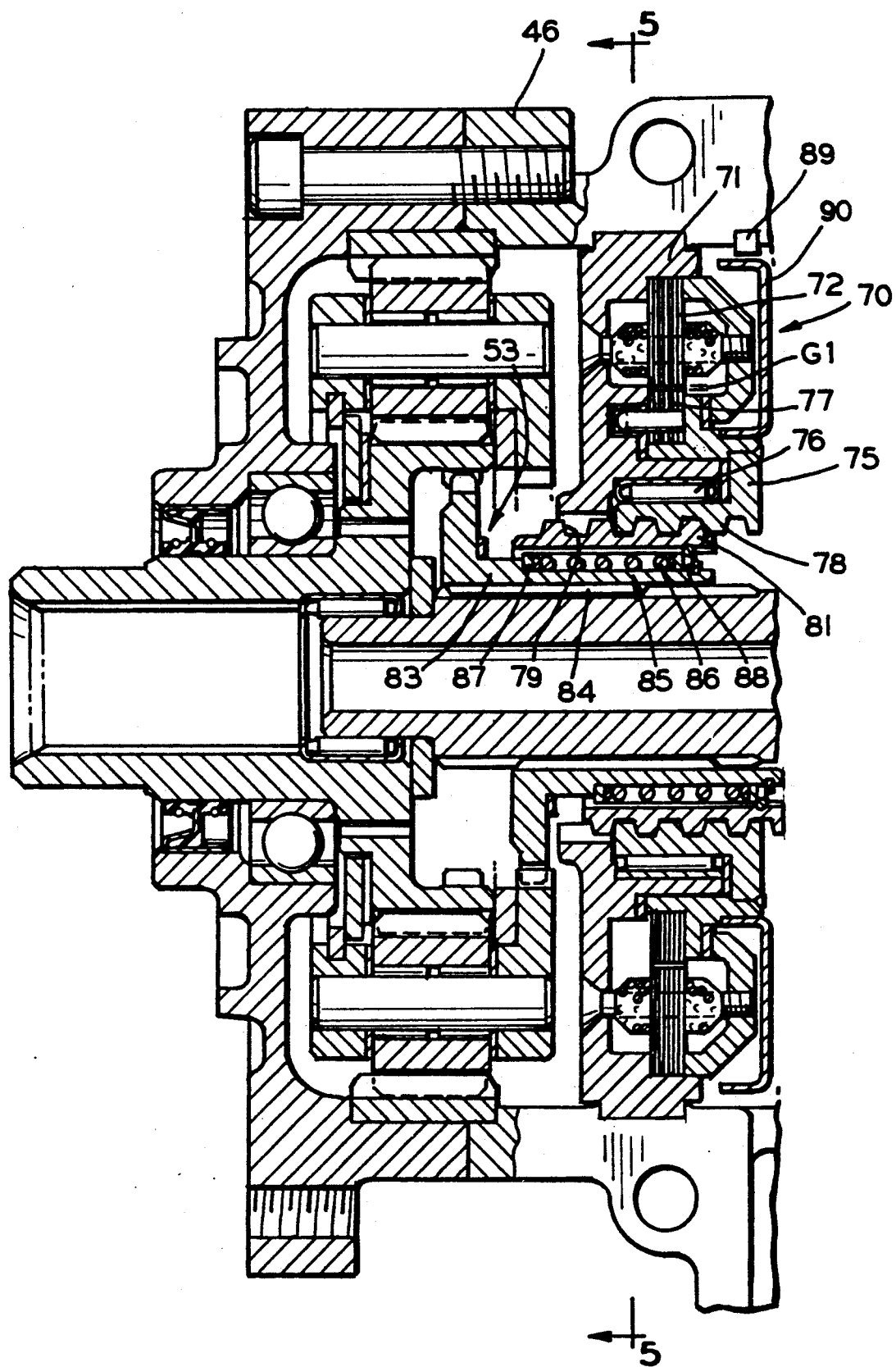
FIG. 4 is an enlarged fragmentary sectional view of the portion of FIG. 3 which illustrates the range shift actuator.

Referring to FIG. 4, the specific construction of the transfer case shown in FIG. 2 will now be discussed, with particular attention to the construction and operation of the range shift actuator 41 and the clutch actuator 42. Reference numerals used in the schematic view of FIG. 2 will be used in FIG. 3 to refer to like components.

Figure 5:
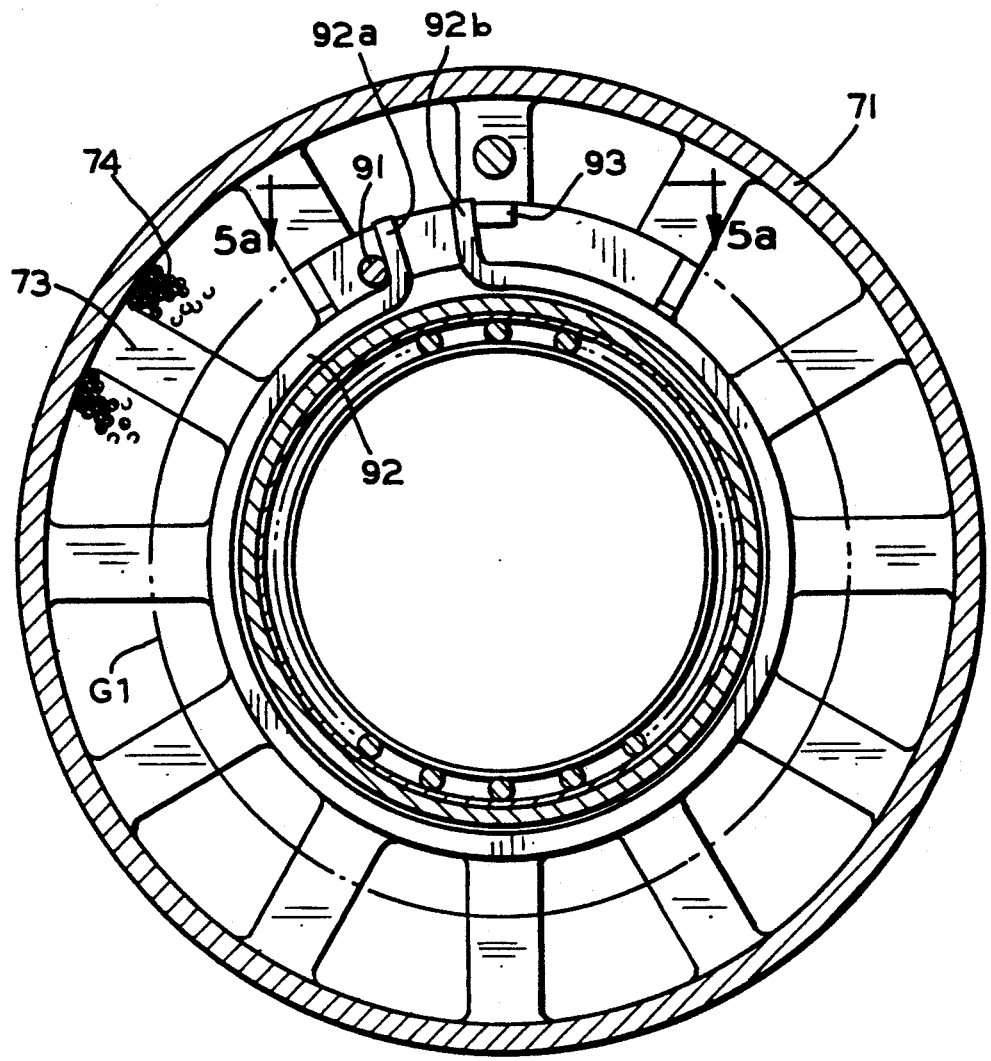
FIG. 5 is a sectional view taken along the line 5—5 of FIG. 4 and illustrating the rotational stop incorporated in the range shift actuating motor.

The range shift actuator 41 includes a coaxial mounted electric rotary motor 70 having a multi-piece outer motor housing 71 fixed relative to the transfer case housing 46, and which carries a laminated stator plates 72. As shown in FIG. 5, the stator plates 72 are provided with a plurality of circumferentially spaced and radially inwardly extending poles 73 individually wrapped with windings 74.

A hollow motor shaft 75 is rotatably supported relative to the motor housing 71 by a roller bearing 76. The radial outer portion of the shaft 75 carries a plurality of laminated rotor plates 77 having an outer radial periphery spaced from the inner periphery of the stator plates by an air gap G1. The inner portion of the motor shaft 75 is provided with internal threads 78 which engage external threads 79 of the range shift sleeve 53 to define a linear screw arrangement which functions as a gear reducer. Once the desired shift is made, no further electric current need to be supplied to the actuator motor to maintain the set position of the shift sleeve 53, since the inherent frictional characteristics of the linear screw arrangement prevent the shift sleeve from back driving the motor shaft. Thus, in the event of a motor failure or loss of electrical power, the previous shift sleeve position will be maintained.

The range shift sleeve 53 is shown in FIGS. 3 and 4 as an assembly and includes an outer sleeve 81 provided with the external threads 79 which engage internal motor shaft threads 78, and an inner sleeve 83 supported on the rear output shaft 44 by a splined connection at 84 which permits limited axial movement of the shift sleeve assembly 53 along the shaft. The forward end of the inner sleeve 83 carries the external shift splines 54. In accordance with one feature of the present invention, the outer sleeve 81 is coupled to the inner sleeve 83 by means of a lost motion spring connection 85. The spring connection 85 includes a helical compression spring 86 which normally functions to maintain the sleeves 81 and 83 in an expanded position wherein an outer radial shoulder 87 carried by the inner sleeve 83 engages an inner radial shoulder 88 formed at the rear of the outer sleeve 81.

The electric rotary motor 71 is a three phase, multi-pole, variable reluctance DC motor and is operated by the control 32. DC current is alternately applied to successive windings to cause predetermined rotation of the rotor. Rotation of the motor in one direction causes the associated motor shaft 75 to advance the shift sleeve assembly 53 forwardly (to the left as viewed in FIG. 4) to the high range position shown in FIG. 4 above axis A—A, wherein the external splines 54 of the inner sleeve 81 mates with the internal splines 55 provided on the input shaft 43. Rotation in an opposite direction moves the shift sleeve assembly 53 rearwardly to the low range position shown below the axis A—A, wherein the external splines 54 engage the splines 56 formed with the plane carrier 52. In instances wherein the transfer case is to be shifted to neutral, the control operates the motor 71 to shift the sleeve assembly 53 half the normal distance, by utilizing the feedback information received via a speed sensor 89 coupled to monitor the rotation of a tone wheel 90 supported on the motor shaft 75.

As mentioned above, a spring-biased lost motion connection 85 is incorporated in the range shift sleeve assembly 53. Such a connection has been found advantageous in instances wherein the shift sleeve 53 may encounter some temporary resistance when attempting to effect a shift in either a forward or rearward direction. In this case, the spring-biased connection enables the motor shaft 75 to rotate to its desired position while moving the outer sleeve 81 against the biasing force of the spring 86, as the inner sleeve 83 remains stationary or only shifts partially. When the encountered resistance is overcome, the spring 86 moves the inner sleeve 83 to the selected position.

To ensure that movement of the shifter sleeve is stopped when the sleeve is in the desired high or low range position, it is desirable to provide some type of stop to limit both the forward and rearward movement of the shift sleeve assembly 53. While this can be done by providing axial stops, it can also be accomplished by controlling the operation of the motor. For example, a resolver can be used as feedback device to signal the electronic control of the exact position of the motor shaft 75 (and thus the shifter sleeve), or physical stops can be provided to limit rotation of the motor shaft.

In the embodiment of the invention shown in FIGS. 4 and 5, physical rotation stops are used. In particular, the actuator and transfer case are designed such that two revolutions of the motor shaft causes the precise amount of axial movement required to shift the sleeve assembly 53 between the higher and lower range positions. The particular structure used to accomplish this function is shown in FIG. 5, and includes a stop pin 91 axially extending from the outer portion of the motor shaft 75, a stop ring 92 rotatably supported within a gap formed between the motor housing 71 and the motor shaft 75 and having radial tangs 92a and 92b, and a housing tang stop 93 on the motor housing and adapted to engage the stop ring tangs 92a and 92b.

Figure 5A:
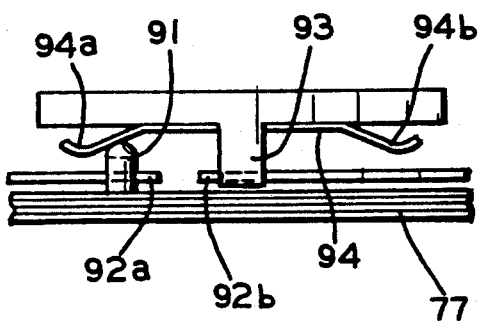
FIG. 5a is a sectional view taken along the line 5a—5a of FIG. 5.

When moving from one position to another, rotation of the motor shaft 75 causes the pin 91 to move approximately one complete revolution with the shaft 75 before it engages the one tang 92a of the ring 92. Further rotation in the same direction causes the ring 92 to move with the pin 91 and the shaft 75. As the shaft 75 approaches the end of the second revolution, the other tang 92b will engage the housing stop 93, thereby preventing any further rotation of the output shaft. At this point, the control will sense that the motor has stalled and shut off further power to the motor. Shifting in the opposite direction is accomplished in a similar manner. As shown in FIG. 5a, a spring detent clip 94 having axially extending end tabs 94a and 94b is secured to the motor housing and functions to locate the stop pin 91 in the neutral position.

Figure 6:
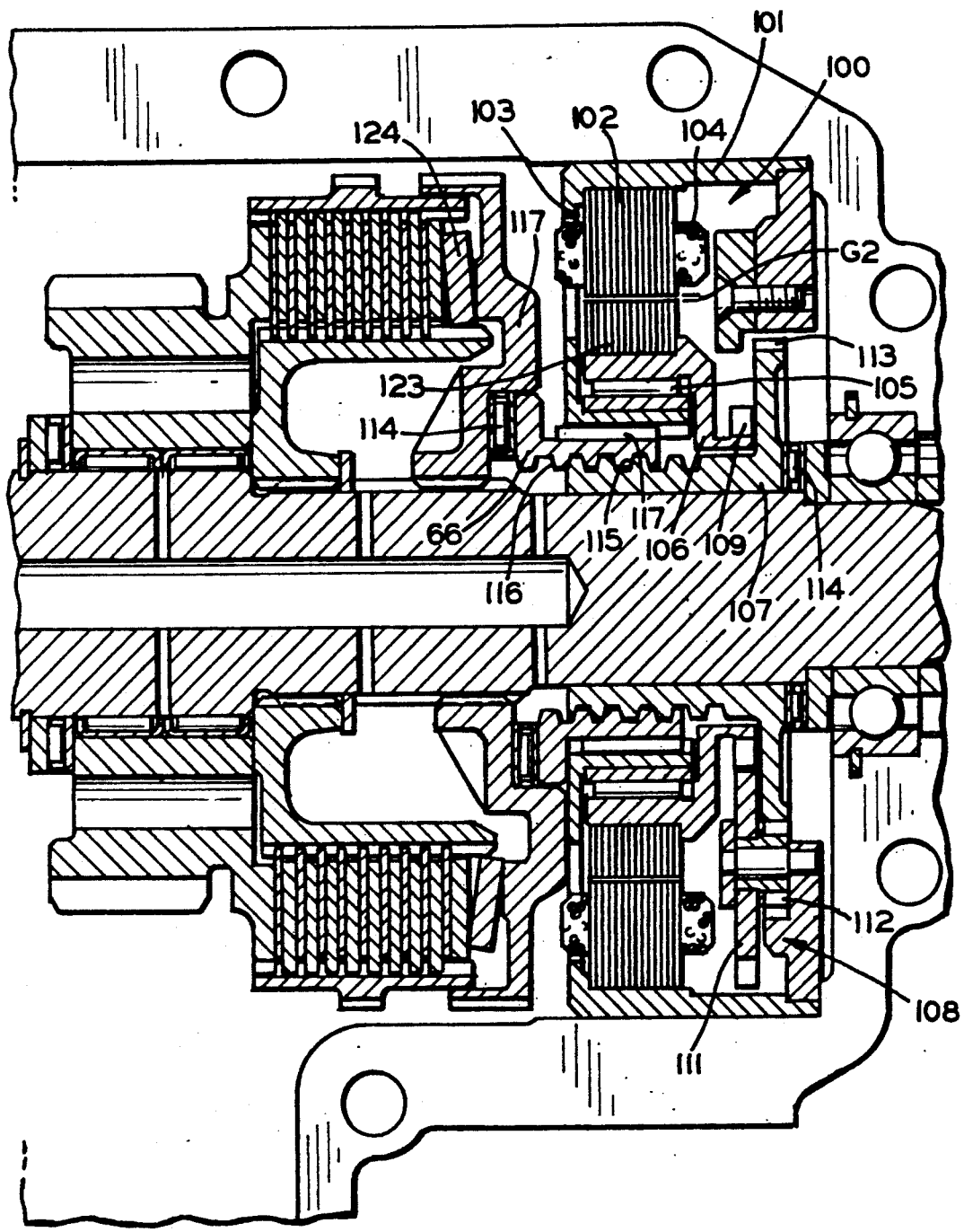
FIG. 6 is an enlarged fragmentary sectional view of the portion of FIG. 3 illustrating the clutch actuator.

The clutch actuator 42 utilizes a coaxial electric rotary motor arrangement similar to the range shift actuator, except that the motor has a larger torque capacity, and that additional gear reduction (in addition to the gear reduction provided by the linear threads) is added to enable the actuator to generate a sufficient axial force to fully engage the clutch. As shown in FIG. 6, a motor 100 includes a multi-piece motor housing 101 fixed relative to the transfer case housing, and which carries a stacked array of laminated stator plates 102. The plates 102 are provided with a plurality of circumferentially spaced and radially inwardly extending poles 103 individually wrapped with windings 104. The motor housing 101 carries a roller bearing 105 which rotatably supports a hollow motor shaft 106. The outer portion of the shaft 106 carries a stacked array of laminated rotor plates 123 having an outer edge spaced from the inner edge of the stator plates by an air gap G2.

Rotation motion of the motor shaft 106 is transmitted to a rotatable externally threaded sleeve 107 by a gear reducer generally indicated at 108. In particular, the inner end of the motor shaft is provided with externally formed gear teeth 109 which engage a larger diameter pinion gear 111 supported for rotation with a smaller diameter pinion gear 112 by the motor housing 101. The smaller diameter pinion gear 112 is adapted to engage an externally toothed portion 113 of the rotatable sleeve 107. The inner cylindrical surface of the rotatable sleeve 107 is slightly spaced from the adjacent outer surface of the rear output shaft 44, and has a rearward end which engages a thrust bearing 114. The rotatable sleeve 107 is provided with external threads 115 which engage internal threads 116 formed on the axially shiftable clutch actuating sleeve 66. The actuating sleeve 66 is restrained from rotation by a splined connection at 117 with the motor housing 101, and includes a forward end coupled to a clutch pressure plate 118 by a thrust bearing 119. The pressure plate 118 exerts an axial force on the clutch pack via a Bellville spring 124.

In operation, to disengage the clutch (for 2WD), the motor is operated to axially shift the actuating sleeve 66 to its most rearward position, as represented below the axis A—A in FIG. 3. To fully engage the clutch (for part-time 4WD), the actuating sleeve 66 is moved to a forward position wherein the effective holding torque of the clutch is such that the clutch is in the "locked" state. In the AUTO mode, the sleeve is moved to a "ready" position just before partial engagement of the clutch occurs. Alternatively, the AUTO mode could position the clutch at a "slight bias" position, such that some torque will always be transmitted to the front wheels when in this mode. In all of the above situations, when power is removed from the motor 100, the actuating sleeve 66 will maintain its position, since the internal frictional characteristics of the linear screw arrangement prevent the actuator 66 from back driving the motor shaft. This also insures that clutch engagement (or disengagement) will be maintained in the event of motor failure or power loss.

Figure 7:
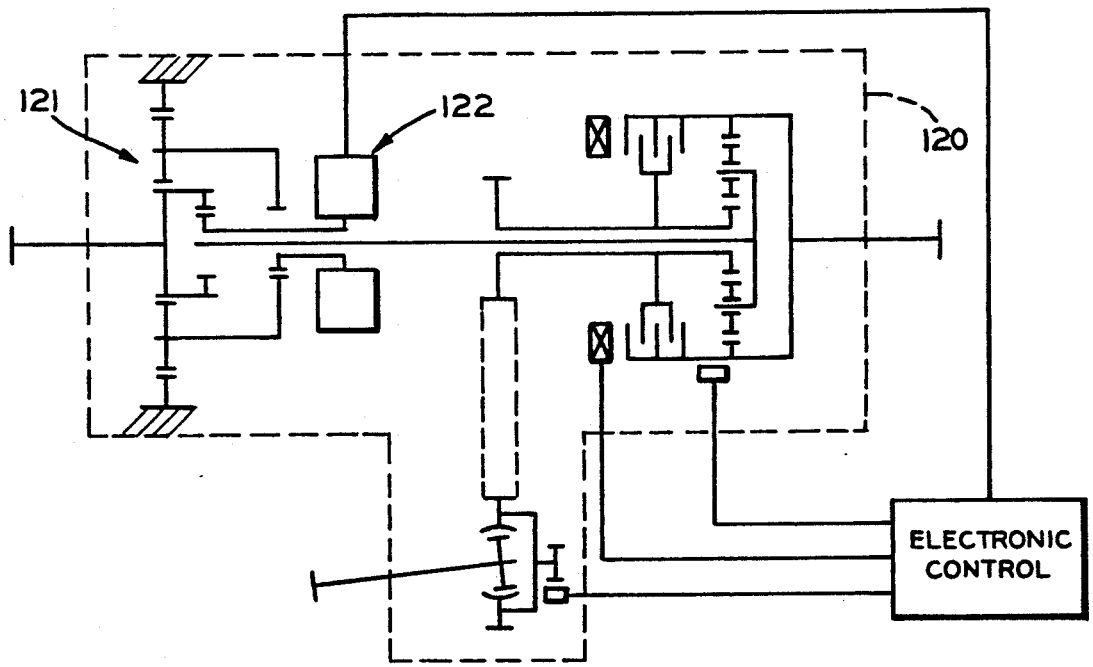
FIG. 7 is a schematic diagram illustrating a second example of a transfer case which can utilize the range shift actuator of the present invention in conjunction with an all wheel drive system.

There is shown in FIG. 7 a schematic representation of an "all wheel drive" transfer case 120 which is provided with a range shifting means constructed in accordance with the present invention. In particular, the transfer case 120 includes a planetary gear assembly 121, similar to the planetary gear assembly 48 of FIG. 2, and a range shift actuator 122, similar to the range shift actuator 41 shown in FIGS. 2 and 3. The remaining structure of the transfer case and its associated operation are described in more detail in U.S. Pat. Nos. 4,860,612 and 4,937,750, both incorporated by reference.

It should be noted that the transfer case illustrated in FIGS. 3 and 7 are two examples of transfer cases which can utilize the control features and rotary actuators of the present invention. For example, the actuators could also be used in other vehicle transmissions.

The transfer case and drive system of the present invention have been illustrated and described in what is considered to represent its preferred embodiment. However, it will be appreciated that the transfer case and drive system can be modified without departing from the spirit or scope of the attached claims.

We claim:

1. An electronic shift actuator for a vehicle four wheel drive torque transfer case having a torque transfer shaft rotatably supported within a transfer case, said actuator comprising:
   a rotary electric motor coaxially mounted relative to the transfer shaft and including a hollow motor shaft surrounding the transfer shaft;
   a hollow sleeve means surrounding said transfer shaft and axially movable between a first axial position wherein the transfer case operates in a first mode and a second axial position wherein the transfer case operates in a second mode;
   means for preventing rotation of said sleeve means relative to said transfer case; and
   means for translating the rotational movement of said motor shaft to selective axial movement of said sleeve means between said first and second axial positions.

2. The invention defined in claim 1 wherein said transfer case includes clutch means for operating said transfer case in either a two or four wheel drive mode, and wherein said sleeve means operates said clutch means.

3. The invention defined in claim 2 wherein said means for translating is a linear screw.

4. The invention defined in claim 1 wherein said transfer case includes clutch means for operating said transfer case in either a two or four wheel drive mode, and wherein said sleeve means operates said clutch means.

5. The invention defined in claim 4 wherein said means for translating is a linear screw.

6. The invention defined in claim 4 wherein said clutch means is a multi-plate clutch.

7. The invention defined in claim 1 wherein said means for translating is a linear screw.

8. The invention defined in claim 7 wherein means for translating includes an axially extending first threaded portion provided on said motor shaft, and an axially extending second threaded portion on said sleeve means for threaded engagement with said first threaded portion, such that rotary movement of said motor shaft effects axial movement of said sleeve means.

9. The invention defined in claim 1 wherein said sleeve means includes a first sleeve coupled to be driven by said motor shaft, and a second sleeve moveable between said first and second axial positions, and resilient connection means coupled between said first and second sleeves for providing limited axial movement of said second sleeve relative to said first sleeve.

10. The invention defined in claim 9 wherein said resilient connection means includes a spring biased lost motion connection coupled between said first and second sleeves for normally biasing said sleeves in an axial extended position.

11. The invention defined in claim 1 and further including stop means for limiting the axial movement of said sleeve means in at least one axial direction to define one of the first and second axial positions.

12. The invention defined in claim 11 wherein said stop means includes a stop pin coupled to said motor shaft and adapted to revolve around an axis as said motor shaft is rotated, a stop ring engageable with said pin and rotatably supported about said axis and including tang means extending therefrom, and a housing stop fixed relative to the transfer case and engageable with said tang means,, said pin adapted to engage said tang means and travel with said stop ring within one revolution thereof, and said tang means adapted to engage said housing stop within one revolution thereof to limit any further movement of said stop pin and said tang means in one direction, thereby limiting said stop pin to no more than two revolutions in either direction.

13. The invention defined in claim 12 and further including tang means for retaining said pin in an intermediate neutral position.

14. The invention defined in claim 12 wherein said tang means includes means for damping the rotation of said stop ring and said stop pin when said tang means engages said housing stop.

15. The invention defined in claim 1 wherein said motor shaft is a first shaft and further including a second hollow shaft surrounding the transfer shaft and adapted to be rotatably driven by said motor shaft, and wherein said means for translating is coupled to translate rotational movement of second shaft to axial movement of said sleeve means.

16. The invention defined in claim 15 and further including gear reduction means connected between said motor shaft and said second shaft.

17. The invention defined in claim 15 wherein said means for translating includes an axially extending first threaded portion provided on said second shaft, and an axially extending second threaded portion on said sleeve means or threaded engagement with said first threaded portion, such that rotary movement of said second shaft effects axial movement of said sleeve means.

18. A transmission comprising:
a housing;
a power transmission shaft;
means for shifting said transmission between first and second gear ranges;
an electronic shift actuator having a rotary electric motor coaxially mounted relative to said transmission shaft and including a hollow motor shaft surrounding the transmission shaft;
a hollow sleeve means operatively coupled to said means for shifting, said sleeve means axially movable between a first axial position wherein the transmission operates in said first gear range, and a second axial position wherein the transmission operates in said second gear range;
means for preventing rotation of said sleeve means relative to said housing; and
means for translating the rotational movement of said motor shaft to selective axial movement of said sleeve means between said first and second axial positions.

19. The invention defined in claim 18 wherein said sleeve means includes a first sleeve coupled to be driven by said motor shaft, and a second sleeve moveable between said first and second axial positions, and resilient connection means coupled between said first and second sleeves for providing limited axial movement of said second sleeve relative to said first sleeve.

20. The invention defined in claim 19 wherein said resilient connection means includes a spring biased lost motion connection coupled between said first and second sleeves for normally biasing said sleeves in an axial extended position.

* * * * *